United States Patent
Park et al.

(10) Patent No.: US 8,830,183 B2
(45) Date of Patent: Sep. 9, 2014

(54) LIQUID CRYSTAL DISPLAY HAVING A BUILT-IN TOUCH SCREEN USING CAPACITANCE AND OPTICAL INFORMATION FOR DETECTING A TOUCH POSITION

(75) Inventors: Jin-Woo Park, Yongin (KR); Sang-Uk Kim, Yongin (KR); Hee-Chul Hwang, Yongin (KR); My-Kyung Jeon, Yongin (KR); Hideo Yoshimura, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 439 days.

(21) Appl. No.: 12/834,102

(22) Filed: Jul. 12, 2010

(65) Prior Publication Data

US 2011/0080357 A1 Apr. 7, 2011

(30) Foreign Application Priority Data

Oct. 6, 2009 (KR) .................. 10-2009-0094559

(51) Int. Cl.
| | |
|---|---|
| *G06F 3/041* | (2006.01) |
| *G06F 3/044* | (2006.01) |
| *G02F 1/1335* | (2006.01) |
| *G02F 1/1333* | (2006.01) |
| *G02F 1/133* | (2006.01) |
| *G02F 1/1362* | (2006.01) |

(52) U.S. Cl.
CPC ........ *G06F 3/0412* (2013.01); *G02F 1/133514* (2013.01); *G02F 1/13338* (2013.01); *G02F 2001/13312* (2013.01); *G02F 2001/136222* (2013.01); *G06F 3/044* (2013.01)
USPC ........................................................ 345/173

(58) Field of Classification Search
USPC ........................................................ 345/173
See application file for complete search history.

(56) References Cited

U.S. PATENT DOCUMENTS

| | | |
|---|---|---|
| 7,773,068 B2 | 8/2010 | Nakamura et al. |
| 2006/0017710 A1 | 1/2006 | Lee et al. |

(Continued)

FOREIGN PATENT DOCUMENTS

| | | |
|---|---|---|
| JP | 2004-534974 | 11/2004 |
| JP | 2006-40289 | 2/2006 |

(Continued)

OTHER PUBLICATIONS

KIPO Office action dated Sep. 30, 2011, for Korean priority Patent application 10-2009-0094559, 1 page.

(Continued)

*Primary Examiner* — Long D Pham
(74) *Attorney, Agent, or Firm* — Christie, Parker & Hale, LLP

(57) ABSTRACT

A liquid crystal display (LCD) with a built-in touch screen includes: a first substrate including a pixel area having a plurality of pixels and a sensor area having a plurality of photosensors; a second substrate positioned over the first substrate, and including a color filter, a light receiving portion, a transparent electrode layer, and a front polarizing plate; an LCD panel including a liquid crystal layer interposed between the first and second substrates; and a touch screen driver circuit to sense a capacitance variation provided through a first sensing line connected to the transparent electrode layer when an object is in contact with the LCD panel, and to output position information of the object, sensed by using optical information sensed through a second sensing line connected the plurality of photosensors when the capacitance variation is greater than or equal to a predetermined threshold value.

19 Claims, 2 Drawing Sheets

(56) References Cited

U.S. PATENT DOCUMENTS

| | | |
|---|---|---|
| 2006/0053387 A1 | 3/2006 | Ording |
| 2008/0018612 A1* | 1/2008 | Nakamura et al. ............ 345/173 |
| 2008/0122803 A1* | 5/2008 | Izadi et al. ................... 345/175 |
| 2009/0015555 A1 | 1/2009 | Takashima et al. |
| 2009/0122007 A1 | 5/2009 | Tsuzaki et al. |
| 2009/0289910 A1* | 11/2009 | Hattori ......................... 345/173 |
| 2009/0315840 A1* | 12/2009 | Park et al. .................... 345/173 |
| 2010/0123678 A1* | 5/2010 | Kim et al. ..................... 345/174 |
| 2010/0182273 A1 | 7/2010 | Noguchi et al. |
| 2011/0080357 A1 | 4/2011 | Park et al. |

FOREIGN PATENT DOCUMENTS

| | | |
|---|---|---|
| JP | 2008-27292 | 2/2008 |
| JP | 2009-20759 | 1/2009 |
| JP | 2009-064074 | 3/2009 |
| JP | 2009-116769 | 5/2009 |
| JP | 2010-152671 | 7/2010 |
| KR | 10-2004-0077269 | 9/2004 |
| KR | 10-2006-0009602 | 2/2006 |
| KR | 10-2007-0082750 | 8/2007 |
| KR | 10-2008-0044017 | 5/2008 |
| KR | 10-0833621 | 5/2008 |
| KR | 10-2009-009589 0 | 9/2009 |
| WO | WO 02/35460 A1 | 5/2002 |
| WO | WO 2009/119664 A1 | 10/2009 |

OTHER PUBLICATIONS

KIPO Office action dated Jan. 20, 2011, for Korean priority Patent application 10-2009-0094559.
JP Office action dated Aug. 7, 2012 of JP 2010-093029 which claims priority to KR 10-2009-0094559.
KIPO Office action dated Sep. 30, 2011 for Korean Patent application 10-2009-0094560, (1 page).
KIPO Office action dated Jan. 19, 2011 for Korean Patent application 10-2009-0094560, (3 pages).
JPO Office action dated Aug. 7, 2012 for Japanese Patent application 2010-093029, (2 pages).
U.S. Office action dated Dec. 17, 2013, for cross reference U.S. Appl. No. 12/834,157, (8 pages).

* cited by examiner

LIQUID CRYSTAL DISPLAY HAVING A BUILT-IN TOUCH SCREEN USING CAPACITANCE AND OPTICAL INFORMATION FOR DETECTING A TOUCH POSITION

CROSS-REFERENCE TO RELATED APPLICATION

This application claims the benefit of Korean Patent Application No. 10-2009-0094559, filed Oct. 6, 2009, in the Korean Intellectual Property Office, the disclosure of which is incorporated herein by reference.

BACKGROUND OF THE INVENTION

1. Field of the Invention

Aspects of the present invention relate to a liquid crystal display (LCD) with a built-in touch screen, and more particularly, to an LCD with a built-in touch screen of a photosensor type, which has an operational reliability improved by combining a capacitance type with the photosensor type.

2. Description of the Related Art

A touch screen is provided on a front face of an image display device so that a user can select an instruction content displayed on a screen of the image display device using a user's hand or an object. The touch screen is in direct contact with the user's hand or the object. The touch screen senses a contact position, and the image display device receives a content instructed at the contact position as an input signal so as to be driven based on the input signal.

An image display device having a touch screen does not require a separate input device (such as a keyboard or mouse) connected to the image display device to operate. Hence, its application fields have been gradually extended. Recently, touch screens have been widely used in liquid crystal displays (LCDs). An LCD having a touch screen includes an LCD panel to display images and a touch screen panel positioned over the LCD panel to sense position information through a touch input from a user. At this time, a frame or adhesive is used to allow the touch screen panel to be positioned over the LCD panel, in which an air layer is formed between the LCD panel and the touch screen panel. In this case, a layer having a different refractive index from those of the LCD panel and the touch screen panel is formed between the LCD panel and the touch screen panel, and therefore, the optical characteristic of the entire LCD is deteriorated. Furthermore, since a separate touch screen panel is manufactured and then attached to the LCD panel, manufacturing cost is raised, and the thickness of the LCD is increased. Therefore, to solve such and/or other problems, an LCD with a built-in touch screen implemented by integrating a touch screen panel and an LCD panel is required.

Meanwhile, a photosensor or the like may be used to sense position information through a touch input from a user. In this case, a touch position is sensed by distinguish a portion covered by a contact object (such as a finger or touch stick) from a portion onto which external light is incident through the photosensor.

However, in the case of the touch screen of a photosensor type, if the illuminance of external light is low, a difference in illuminance between a portion onto which the external light is incident through a photosensor and a portion covered by a contact object is slight when a touch occurs. Therefore, the recognition rate of the touch may be lowered. On the other hand, if the illuminance of the external light is high, the portion onto which the external light is incident and the portion covered by the contact object are almost recognized as black and white when the touch occurs. Hence, the photosensor may erroneously recognize a shadow as a touch even when a user's finger or object is not touching a touch screen panel, but is located over the touch screen panel. Therefore, operational reliability may be lowered.

Accordingly, there is a need to secure the operational reliability of the touch screen by precisely recognizing a touch event.

SUMMARY OF THE INVENTION

Aspects of the present invention provide a liquid crystal display (LCD) with a built-in touch screen of a photosensor type, which has photosensors provided in an LCD panel and has an operational reliability improved by combining a capacitance type with the photosensor type.

According to an aspect of the present invention, there is provided an LCD with a built-in touch screen, the LCD including: a first substrate including a pixel area having a plurality of pixels to display an image, and a sensor area adjacent to the pixel area and having a plurality of photosensors to sense a position of a contact object; a second substrate positioned over the first substrate, the second substrate including a color filter in an area corresponding to the pixel area on a first surface of the second substrate facing the first substrate, a light receiving portion, onto which external light is incident, in an area of the first surface corresponding to the sensor area, and a transparent electrode layer and a front polarizing plate sequentially stacked on a second surface of the second substrate opposite to the first surface; an LCD panel including a liquid crystal layer interposed between the first and second substrates; and a touch screen driver circuit to sense a capacitance variation provided through a first sensing line connected to the transparent electrode layer when an object is in contact with the LCD panel, and to output position information of the contact object, sensed by using optical information sensed through a second sensing line connected to the plurality of photosensors when the capacitance variation is greater than or equal to a predetermined threshold value.

The touch screen driver circuit may include a controller to determine determining whether a touch of the contact object on the LCD panel, using the capacitance variation provided through the first sensing line, and to output the optical information provided through the second sensing line when the touch occurs; and a position sensor to output the position information of the contact object, sensed by using the optical information provided from the controller.

The touch screen driver circuit may include a controller to determine whether a touch of the contact object on the LCD panel occurs, using the capacitance variation provided through the first sensing line, and outputting a control signal according to whether the touch occurs; and a position sensor driven in response to the control signal provided from the controller to output the position information of the contact object, sensed by using the optical information sensed through the second sensing line.

The touch screen driver circuit may include a controller to determine whether a touch of the contact object on the LCD panel occurs, using the capacitance variation provided through the first sensing line, and outputting a control signal according to whether the touch occurs; a position sensor to output the position information of the contact object, sensed by using the optical information sensed through the second sensing line; and a switch to selectively output the position information of the contact object, received from the position sensor, in response to the control signal, received from the controller.

The LCD may further include a back light assembly positioned below the LCD panel to provide light to the LCD panel, wherein a light shielding layer to prevent the provided light from being incident directly onto the plurality of photosensors may be provided on a surface of the first substrate corresponding to the sensor area The plurality of pixels may be arranged in pixel units, each pixel unit having pixels respectively corresponding red (R), green (G) and blue (B).

A ratio of a number of the plurality of photosensors to a number of the pixel units may be 1:1 or less.

According to another aspect of the present invention, there is provided a liquid crystal display (LCD) with a built-in touch screen, the LCD including: a first substrate including a pixel area having a plurality of pixels to display an image, and a sensor area adjacent to the pixel area and having a plurality of photosensors to sense a position of a contact object; a second substrate positioned over the first substrate, the second substrate including a transparent electrode layer; an LCD panel including a liquid crystal layer interposed between the first and second substrates; and a touch screen driver circuit to sense a capacitance variation provided through a first sensing line connected to the transparent electrode layer when the contact object is in contact with the LCD panel, and to output position information of the contact object, sensed by using optical information sensed through a second sensing line connected to the plurality of photosensors when the capacitance variation is greater than or equal to a predetermined threshold value.

According to another aspect of the present invention, there is provided a touch screen driver circuit of a liquid crystal display (LCD) with an LCD panel, a plurality of photosensors on a first substrate to sense a position of a contact object in contact with the LCD panel, and a transparent electrode layer on a second substrate, the touch screen driver circuit including: a controller to sense a capacitance variation provided through a first sensing line connected to the transparent electrode layer when the contact object is in contact with the LCD panel; and a position sensor to output position information of the contact object, sensed by using optical information sensed through a second sensing line connected the plurality photosensors when the capacitance variation is greater than or equal to a predetermined threshold value.

According to aspects of the present invention, an LCD with a built-in touch screen of a photosensor type is implemented by providing photosensors on a lower substrate of an LCD panel, thereby improving optical characteristics of the LCD, improving its manufacturing cost, and providing a thin LCD. Furthermore, it is precisely determined whether or not a touch event occurs through a capacitance type using a transparent electrode layer formed on the front face of the LCD panel, thereby improving an operational reliability of the LCD with the built-in touch screen.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
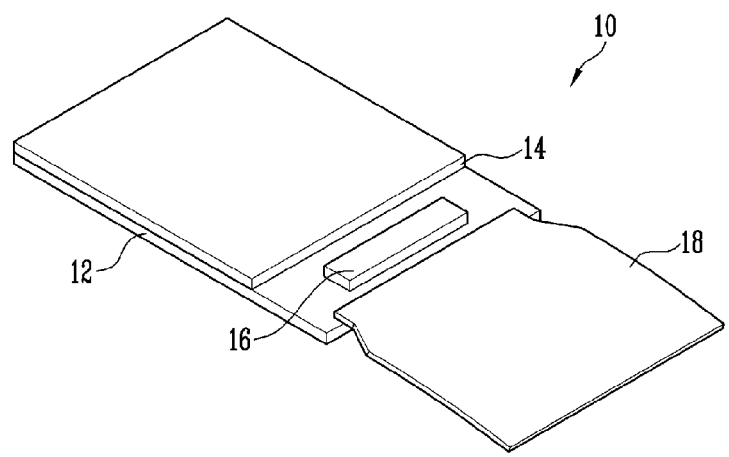
FIG. 1 is a perspective view of a liquid crystal display (LCD) panel according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a perspective view of a liquid crystal display (LCD) panel 10 according to an embodiment of the present invention. Referring to FIG. 1, the LCD panel 10 includes a first substrate 12 having pixel electrodes, thin film transistors (TFTs), and the like formed thereon, a second substrate 14 having color filters and the like formed thereon, and a liquid crystal layer (not shown) interposed between the first and second substrates 12 and 14. Here, the first substrate 12 has a larger area than that of the second substrate 14. A driver integrated circuit (IC) 16 to drive the TFTs and the like is formed on a non-pixel region of the first substrate 12, which is not covered by the second substrate 14. A flexible printed circuit board (FPCB) 18 connected to the driver IC 16 is formed at one end portion of the non-pixel region on which the driver IC 16 is formed.

In the shown embodiment, photosensors are built in the LCD panel 10. That is, the LCD panel 10 is integrally formed with a touch screen of a photosensor type, of which a detailed description will be described later with reference to FIG. 2.

Figure 2:
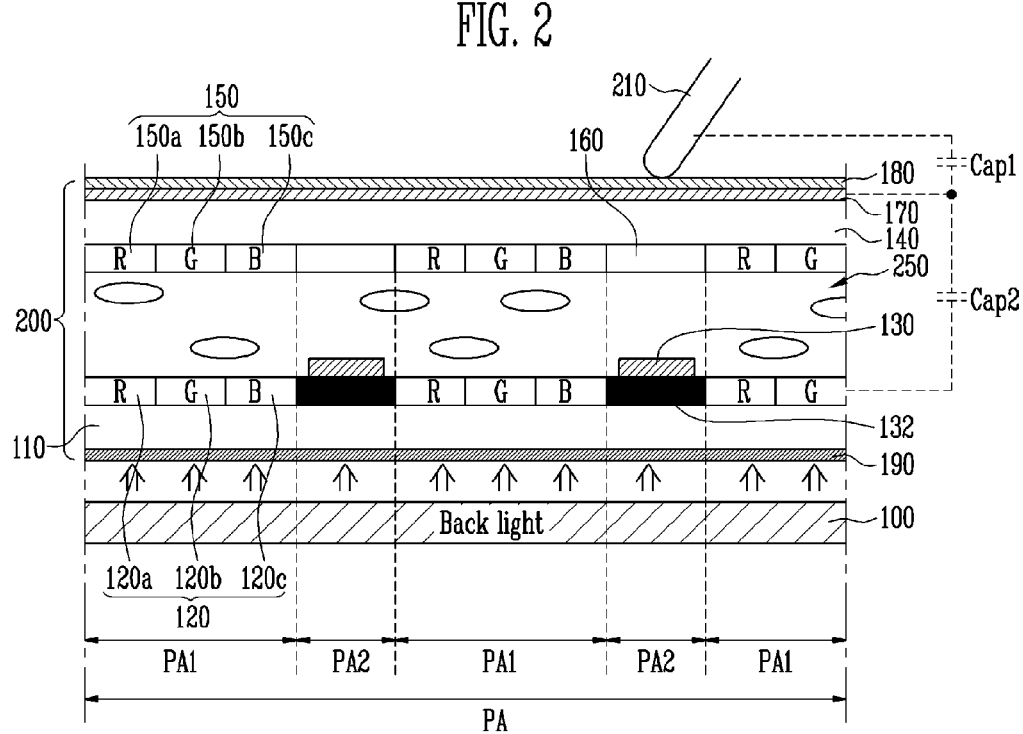
FIG. 2 is a sectional view illustrating a main section of an LCD with a built-in touch screen according to an embodiment of the present invention.

FIG. 2 is a sectional view illustrating a main section of an LCD with a built-in touch screen according to an embodiment of the present invention. Referring to FIG. 2, the LCD with the built-in touch screen includes an LCD panel 200 to sense a position of an object 210 in contact therewith while displaying an image, and a back light assembly 100 to supply light to the LCD panel 200.

The LCD panel 200 includes a first substrate 110 formed at the side of the back light assembly 100, a second substrate 140 provided over the first substrate 110 to be opposite to the first substrate 110, and a liquid crystal layer 250 interposed between the first and second substrates 110 and 140. Although not illustrated in FIG. 2, a pair of alignment layers to align liquid crystal molecules in the liquid crystal layer 250 are formed between the two substrates 110 and 140. Furthermore, a front polarizing plate 180 and a rear polarizing plate 190 are positioned opposite to each other at both sides of the LCD panel 200.

Particularly, in the shown embodiment, a plurality of photosensors 130 to sense a position of an object 210 (such as a finger or a touch stick) in contact with the LCD panel 200 are formed on the upper surface of the first substrate 110 opposite to the liquid crystal layer 250. The photosensors 130 are formed to provide a touch screen operation in the LCD panel 200, and may be regularly disposed on a display area PA of the first substrate 110.

FIG. 2 illustrates a section of the LCD panel 200 in which the photosensors 130 in the display area PA are regularly disposed in a matrix form. At this time, portions of the display area PA in which the photosensors 130 are formed are referred to as sensor areas PA2, and the other portions of the display area PA in which pixels 120 are formed are referred to as pixel areas PA1.

The pixel area PA1 includes a plurality of pixels to display an image. Here, the pixels are arranged in pixel units 120 that each include a red R pixel 120a, a green G pixel 120b, and a blue B pixel 120c. The classification of such colors is determined by a transparent wavelength characteristic of a color filter opposite to each of the pixels. That is, R, G and B color filters 150a, 150b and 150c respectively corresponding to R, G and B are formed on areas of the second substrate 140, respectively corresponding to the R, G and B pixels 120a, 120b and 120c formed on the first substrate 110.

Meanwhile, although not illustrated in FIG. 2, a pixel electrode and a common electrode are formed in the pixel area PA1. The pixel and common electrodes are formed of a transparent electrode material. Depending on the pixel configuration, an auxiliary capacitor, a switching element, and the like are formed in each of the pixels 120a, 120b and 120c. Here, the auxiliary capacitor auxiliarily supplies liquid crystal capacitance between the pixel and common electrodes, and the switching element controls a potential applied to the pixel electrode depending on the potential of an inputted image signal.

The photosensors 130 regularly disposed between the pixel areas PA1 are formed in the sensor areas PA2. For example, the photosensors 130 may be regularly formed on the first substrate 110 between the pixel areas PA1. The photosensors 130 are formed adjacent to the pixel areas PA1 to sense the position of an object 210 in contact with the LCD panel 200. When the ratio of a photosensor 130 to a pixel unit 120 having a plurality of pixels 120a, 120b and 120c respectively corresponding to R, G and B is 1:1, the arrangement density of the photosensors 130 is the maximum. However, it is understood that aspects of the present invention are not limited thereto. That is, the arrangement density of the photosensors 130 may be less than the maximum.

Meanwhile, the back light assembly 100 is positioned at the rear side of the first substrate 110. The back light assembly 100 is positioned opposite to the rear face of the LCD panel 200 to emit light into the display area PA of the LCD panel 200. Here, the light emitted from the back light assembly 100 is transmitted to the pixel areas of the first substrate 110 and the color filters 150 of the second substrate 140 and then displayed on a screen.

A light shielding layer 132 is located beneath each of the sensor areas PA2 on the first substrate 110 so as to prevent light emitted from the back light assembly 100 from being directly incident onto the photosensors 130.

A color filter 150 is located in a region corresponding to each of the pixel areas PA1 on a surface (first face) of the second substrate 140 opposite to the first substrate 110. A light receiving portion 160 onto which external light is incident is formed in a region corresponding to each of the sensor areas PA2 on the same face. Here, the light receiving portion 160 may be implemented as an opening, though aspects of the present invention are not limited thereto. For example, the light receiving portion 160 may be implemented as transmissive film between the color filters 150. External light is incident onto the photosensor 130 through the light receiving portion 160. When external light is covered by the touch object 210, the touch and position of the object 210 is sensed by a difference between light quantities sensed by the photosensor 130.

A transparent electrode layer 170 and a front polarizing plate 180 are sequentially stacked on a second surface (i.e., an upper surface), opposite to the first face of the second substrate 140. The transparent electrode layer 170 is not connected to a ground power source, but is connected to a touch screen driver circuit through a sensing line (not shown), so that a touch generated by the object 210 is provided to the touch screen driver circuit.

Aspects of the present invention may be usefully applied to an in-plane switching mode LCD in which a transparent ground electrode to prevent electrostatic discharge (ESD) is formed at a front face of the LCD panel 200. However, is it understood that aspects of the present invention are not limited thereto. Unlike the general in-plane switching mode LCD, aspects of the present invention may be applied to an LCD of a capacitance type, which can precisely determine whether a touch occurs without using the transparent electrode layer 170 as a ground electrode. More specifically, when a touch is generated by the touch object 210, the first capacitance of a first capacitor Cap1 and the second capacitance of a second capacitor Cap2 are varied. Here, the first capacitance of the first capacitor Cap1 is formed between the touch object 210 and the transparent electrode layer 170, and the second capacitance of the second capacitor Cap2 is formed between the transparent electrode layer 170 and the first substrate 110 (e.g., between the transparent electrode layer 170 and a TFT of each of the pixels 120a, 120b and 120c). In this case, the total variation of the first and second capacitances is sensed through a first sensing line connected to the transparent electrode layer 170. If the sensed total variation is greater than or equal to a threshold value, it is determined that a touch occurs. When it is determined that the touch occurs, the position information of the sensed object 210 is output using optical information sensed by the photosensors 130. That is, according to aspects of the present invention, it can be precisely determined whether a touch occurs using the entire screen like one button. Here, the threshold value to determine whether a touch occurs may be experimentally determined based on the capacitance variation when the touch occurs.

As described above, according to aspects of the present invention, the LCD with the built-in touch screen of the photosensor type is implemented by forming the photosensors 130 on a lower substrate (i.e., the first substrate 110) of the LCD panel 200, thereby improving optical characteristics of the LCD, improving its manufacturing cost, and providing a thin LCD. Further, it is precisely determined whether a touch occurs through the capacitance type using the transparent electrode layer 170 formed on the front face of the LCD panel 200, thereby improving operational reliability of the LCD with the built-in touch screen.

Figure 3:
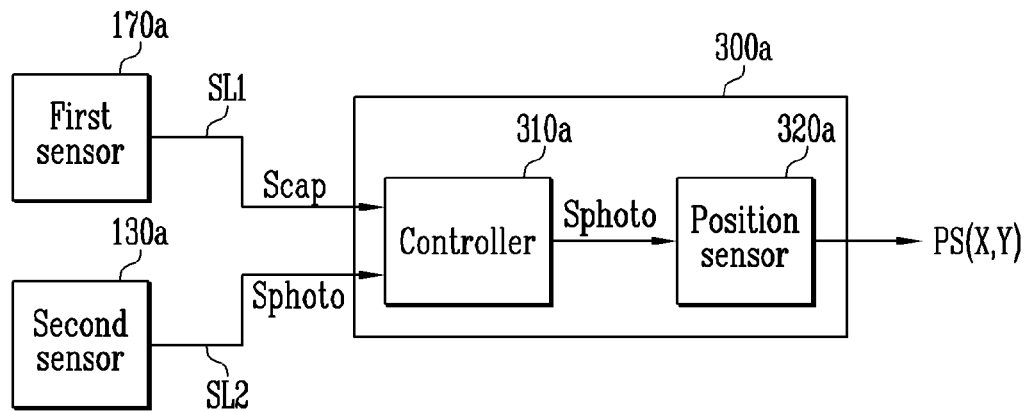
FIG. 3 is a block diagram illustrating a touch screen driver circuit according to an embodiment of the present invention.

FIG. 3 is a block diagram illustrating a touch screen driver circuit 300a according to an embodiment of the present invention. Referring to FIG. 3, when an object 210 is in contact with an LCD panel 200, the touch screen driver circuit 300a senses a capacitance variation Scap through a first sensing line SL1 connected to a transparent electrode layer 170. If the capacitance variation Scap is greater than or equal to a predetermined threshold value, the touch screen driver circuit 300a outputs the position information PS (X,Y) of the object 210, sensed by using optical information Sphoto sensed through a second sensing line SL2 connected to photosensors 130. To this end, the touch screen driver circuit 300a includes a controller 310a and a position sensor 320a.

The controller 310a receives a capacitance variation Scap provided from a first sensor 170a through the first sensing line SL1 and receives optical information Sphoto provided from a second sensor 130a through the second sensing line SL2. Here, the first sensor 170a is used to sense the capacitance variation Scap produced by a touch. For example, the first sensor 170a may be implemented by the transparent electrode layer 170 illustrated in FIG. 2. The second sensor 130a is used to sense the contact position of an object 210. For example, the second sensor 130a may be implemented by the photosensor 130 illustrated in FIG. 2.

The controller 310a determines whether a touch occurs, using the capacitance variation Scap, and then provides the optical information Sphoto provided through the second sensing line SL2 to the position sensor 320a when the touch occurs. That is, if the capacitance variation Scap is greater than or equal to a threshold value, the controller 310a determines that a touch event, and provides the optical information Sphoto provided through the second sensing line SL2 to the position sensor 320a. Then, the position sensor 320a outputs position information PS (X,Y) by sensing the position information of the object 210 (e.g., a coordinate value based on the touch position of the object 210), using the optical information Sphoto.

Figure 4:
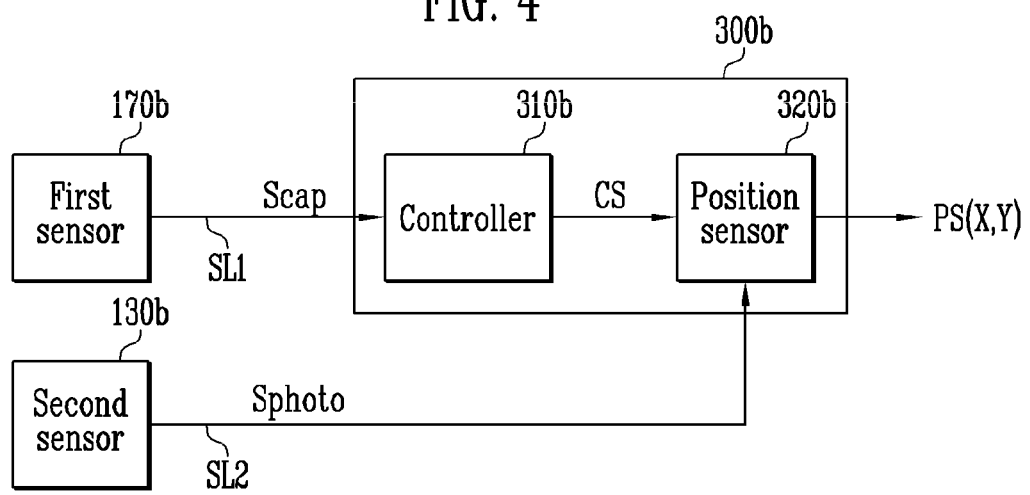
FIG. 4 is a block diagram illustrating a touch screen driver circuit according to another embodiment of the present invention.

FIG. 4 is a block diagram illustrating a touch screen driver circuit 310b according to another embodiment of the present invention. In FIG. 4, detailed descriptions of components identical or similar to those of FIG. 3 will be omitted. Referring to FIG. 4, a controller 310b of the touch screen driver circuit 300b determines whether a touch occurs using a capacitance variation Scap provided by a first sensor 170b through a first sensing line SL1, and accordingly outputs a control signal CS to a position sensor 320b.

When it is determined that the touch occurs, the controller 310b outputs the control signal CS so that the position sensor 320b implements a position sensing algorithm. When it is determined that the touch does not occur, the position sensor 320b outputs the control signal CS so that the position detector 320b does not implement the position sensing algorithm. The position sensor 320b is driven in response to the control signal CS provided by the controller 310b. When the control signal CS to implement the position sensing algorithm is input to the position sensor 320b, the position sensor 320b outputs the position information PS (X,Y) of an object 210 using optical information Sphoto sensed by a second sensor 130b through a second sensing line SL2.

Figure 5:
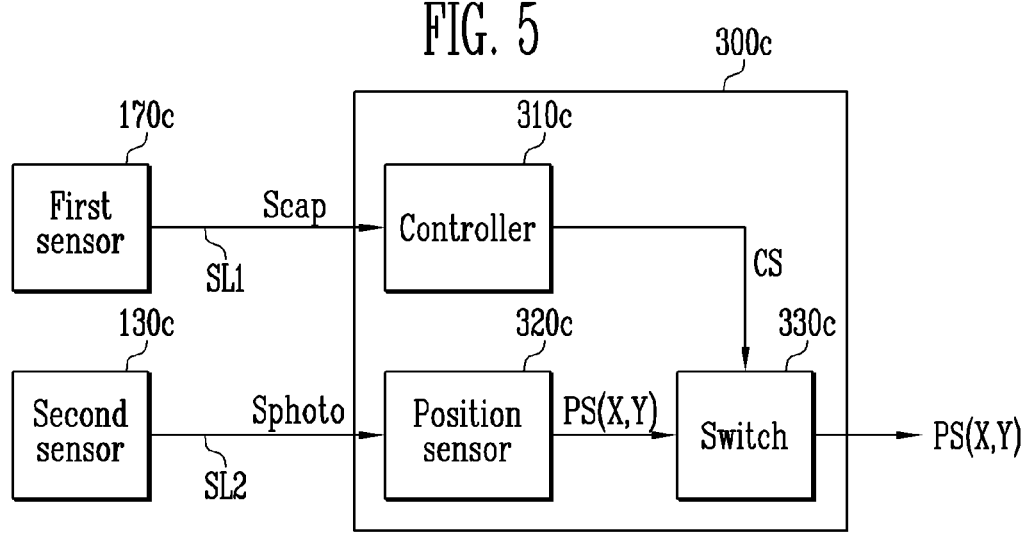
FIG. 5 is a block diagram illustrating a touch screen driver circuit according to still another embodiment of the present invention.

FIG. 5 is a block diagram illustrating a touch screen driver circuit 300c according to still another embodiment of the present invention. In FIG. 5, detailed descriptions of components identical or similar to those of FIGS. 3 and 4 will be omitted. Referring to FIG. 5, the touch screen driver circuit 300c includes a controller 310c, a position sensor 320c, and a switch 330c.

The controller 310c determines whether a touch occurs using a capacitance variation Scap provided by a first sensor 170c through a first sensing line SL1, and accordingly outputs a control signal CS to the switch 330c. The position sensor 320c receives optical information Sphoto provided by a second sensor 130c through a second sensing line SL2 and outputs the position information PS(X,Y) of an object 210, sensed by using the optical information Sphoto, to the switch 330c. The switch 330c selectively outputs the position information PS (X,Y) of the object, output from the position sensor 320c, in response to the control signal CS.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A liquid crystal display (LCD) with a built-in touch screen, the LCD comprising:
   a first substrate comprising a pixel area having a plurality of pixels to display an image, and a sensor area adjacent to the pixel area and having a plurality of photosensors to sense a position of a contact object;
   a second substrate positioned over the first substrate, the second substrate comprising a color filter in an area corresponding to the pixel area on a first surface of the second substrate facing the first substrate, a light receiving portion onto which external light is incident in an area of the first surface corresponding to the sensor area, and a transparent electrode layer and a front polarizing plate sequentially stacked on a second surface of the second substrate opposite to the first surface;
   an LCD panel comprising a liquid crystal layer interposed between the first and second substrates; and
   a touch screen driver circuit to sense a capacitance variation provided through a first sensing line electrically connected to the transparent electrode layer when the contact object is in contact with the LCD panel, and to output position information of the contact object, which corresponds to optical information that is produced according to external light being blocked by the contact object, and which is provided through a second sensing line electrically connected to the plurality of photosensors, when the capacitance variation is greater than or equal to a predetermined threshold value,
   wherein the capacitance variation is between a first capacitance of a first capacitor and a second capacitance of a second capacitor,
   wherein the first capacitance is formed between the contact object and the transparent electrode layer, and
   wherein the second capacitance is formed between the transparent electrode layer and the first substrate.

2. The LCD as claimed in claim 1, wherein the touch screen driver circuit comprises:
   a controller to determine whether a touch of the contact object on the LCD panel occurs by using the capacitance variation provided through the first sensing line, and to output the optical information provided through the second sensing line when the touch occurs; and
   a position sensor to output the position information of the contact object by using the optical information provided to the position sensor from the controller.

3. The LCD as claimed in claim 1, wherein the touch screen driver circuit comprises: a controller to determine whether a touch of the contact object on the LCD panel occurs by using the capacitance variation provided through the first sensing line, and to output a control signal according to whether the touch occurs;
   and a position sensor configured to be driven in response to the control signal provided from the controller to output the position information of the contact object by using the optical information provided to the position sensor through the second sensing line.

4. The LCD as claimed in claim 1, wherein the touch screen driver circuit comprises:
   a controller to determine whether a touch of the contact object on the LCD panel occurs by using the capacitance variation provided through the first sensing line, and to output a control signal according to whether the touch occurs;

a position sensor to output the position information of the contact object by using the optical information provided to the position sensor through the second sensing line; and a switch to selectively output the position information of the contact object, which is received from the position sensor, in response to the control signal, which is received from the controller.

5. The LCD as claimed in claim 1, further comprising:
a back light assembly positioned below the LCD panel to provide light to the LCD panel; and
a light shielding layer located on a surface of the first substrate corresponding to the sensor area and configured to prevent the provided light from being incident directly onto the plurality of photosensors.

6. The LCD as claimed in claim 1, wherein the plurality of pixels are arranged in pixel units, each of the pixel units having a red (R) pixel, a green (G) pixel, and a blue (B) pixel.

7. The LCD as claimed in claim 6, wherein a ratio of a number of a number of the photosensors to a number of the pixel units is 1:1 or less.

8. The LCD as claimed in claim 6, wherein the second substrate further comprises:
a red color filter in an area of the first surface corresponding to the red pixel;
a green color filter in an area of the first surface corresponding to the green pixel; and
a blue color filter in an area of the first surface corresponding to the blue pixel.

9. The LCD as claimed in claim 1, wherein the plurality of photosensors is regularly disposed in matrix form across the first substrate.

10. The LCD as claimed in claim 1, wherein the light receiving portion is an opening or a transmissive film between color filters of the second substrate.

11. The LCD as claimed in claim 1, wherein the position information is a coordinate value corresponding to the position of the contact object on the LCD panel.

12. A liquid crystal display (LCD) with a built-in touch screen, the LCD comprising:
a first substrate comprising a pixel area having a plurality of pixels to display an image, and a sensor area adjacent to the pixel area and having a plurality of photosensors to sense a position of a contact object;
a second substrate positioned over the first substrate, the second substrate comprising a transparent electrode layer;
an LCD panel comprising a liquid crystal layer interposed between the first and second substrates; and
a touch screen driver circuit to sense a capacitance variation provided through a first sensing line electrically connected to the transparent electrode layer when the contact object is in contact with the LCD panel, and to output position information of the contact object, which corresponds to optical information that is produced according to external light being blocked by the contact object, and which is provided through a second sensing line electrically connected to the plurality of photosensors, when the capacitance variation is greater than or equal to a predetermined threshold value,
wherein the capacitance variation is between a first capacitance of a first capacitor and a second capacitance of a second capacitor,
wherein the first capacitance is formed between the contact object and the transparent electrode layer, and
wherein the second capacitance is formed between the transparent electrode layer and the first substrate.

13. The LCD as claimed in claim 12, wherein the touch screen driver circuit comprises:
a controller to determine whether a touch of the contact object on the LCD panel occurs by using the capacitance variation provided through the first sensing line, and to output the optical information provided through the second sensing line when the touch occurs; and
a position sensor to output the position information of the contact object by using the optical information provided to the position sensor from the controller.

14. The LCD as claimed in claim 12, wherein the touch screen driver circuit comprises:
a controller to determine whether a touch of the contact object on the LCD panel occurs by using the capacitance variation provided through the first sensing line, and to output a control signal according to whether the touch occurs; and
a position sensor driven in response to the control signal provided from the controller to output the position information of the contact object by using the optical information provided to the position sensor through the second sensing line.

15. The LCD as claimed in claim 12, wherein the touch screen driver circuit comprises:
a controller to determine whether a touch of the contact object on the LCD panel occurs by using the capacitance variation provided through the first sensing line, and to output a control signal according to whether the touch occurs;
a position sensor to output the position information of the contact object by using the optical information provided to the position sensor through the second sensing line; and
a switch to selectively output the position information of the contact object, which is received from the position sensor, in response to the control signal, which is received from the controller.

16. A touch screen driver circuit of a liquid crystal display (LCD) with an LCD panel, a plurality of photosensors on a first substrate to sense a position of a contact object in contact with the LCD panel, and a transparent electrode layer on a second substrate, the touch screen driver circuit comprising:
a controller to sense a capacitance variation provided through a first sensing line electrically connected to the transparent electrode layer when the contact object is in contact with the LCD panel; and
a position sensor to output position information of the contact object, which corresponds to optical information that is produced according to external light being blocked by the contact object, and which is provided through a second sensing line electrically connected to the plurality of photosensors, when the capacitance variation is greater than or equal to a predetermined threshold value,
wherein the capacitance variation is between a first capacitance of a first capacitor and a second capacitance of a second capacitor,
wherein the first capacitance is formed between the contact object and the transparent electrode layer, and
wherein the second capacitance is formed between the transparent electrode layer and the first substrate.

17. The touch screen driver circuit as claimed in claim 16, wherein:
the controller is configured to determine whether a touch of the contact object on the LCD panel occurs by using the capacitance variation provided through the first sensing line, and is configured to output the optical information provided through the second sensing line when the touch occurs; and the position sensor is configured to output the position information of the contact object, by using the optical information provided to the position sensor from the controller.

18. The touch screen driver circuit as claimed in claim 16, wherein:

the controller is configured to determine whether a touch of the contact object on the LCD panel occurs by using the capacitance variation provided through the first sensing line, and is configured to output a control signal according to whether the touch occurs; and the position sensor is configured to be driven in response to the control signal provided from the controller to output the position information of the contact object by using the optical information provided to the position sensor through the second sensing line.

19. The touch screen driver circuit as claimed in claim 16, further comprising a switch to selectively output the position information of the contact object, which is received from the position sensor, in response to a control signal, which is received from the controller, wherein the controller is configured to determine whether a touch of the contact object on the LCD panel occurs by using the capacitance variation provided through the first sensing line, and is configured to output the control signal according to whether the touch occurs, and wherein the position sensor outputs the position information of the contact object to the switch by using the optical information provided to the position sensor through the second sensing line.

* * * * *